(12) United States Patent
Zha et al.

(10) Patent No.: US 10,972,202 B2
(45) Date of Patent: Apr. 6, 2021

(54) SYSTEMS AND METHODS FOR WIRELESS SIGNAL CLASSIFICATION

(71) Applicant: PC-TEL, Inc., Bloomingdale, IL (US)

(72) Inventors: Wei Zha, Boyds, MD (US); Gang Wang, Germantown, MD (US)

(73) Assignee: PC-TEL, INC., Bloomingdale, IL (US)

( * ) Notice: Subject to any disclaimer, the term of this patent is extended or adjusted under 35 U.S.C. 154(b) by 0 days.

(21) Appl. No.: 16/238,337

(22) Filed: Jan. 2, 2019

(65) Prior Publication Data

US 2020/0213020 A1 Jul. 2, 2020

(51) Int. Cl.
*H04L 27/22* (2006.01)
*H04B 17/336* (2015.01)
*H04J 3/06* (2006.01)
*H04L 27/26* (2006.01)
*H04L 27/36* (2006.01)

(52) U.S. Cl.
CPC .......... *H04B 17/336* (2015.01); *H04J 3/0614* (2013.01); *H04L 27/2656* (2013.01); *H04L 27/36* (2013.01)

(58) Field of Classification Search
CPC ... H04B 17/336; H04L 27/2656; H04L 27/36; H04J 3/0614
See application file for complete search history.

(56) References Cited

U.S. PATENT DOCUMENTS

| | | | |
|---|---|---|---|
| 2006/0215789 A1* | 9/2006 | Ghosh | H04L 1/206 375/329 |
| 2008/0031378 A1 | 2/2008 | Taylor | |
| 2012/0106536 A1* | 5/2012 | Natarahjan | H04L 7/042 370/347 |
| 2012/0140800 A1* | 6/2012 | Cheng | H04L 1/0003 375/219 |
| 2018/0308013 A1* | 10/2018 | O'Shea | G06N 3/08 |

OTHER PUBLICATIONS

P25 Spectrum Sensing with Synthesized and Captured Data, https://www.mathworks.com/help/comm/examples/p25-spectrum-sensing-with-synthesized-and-captured-data.html, Nov. 15, 2018.
Extended European search report from corresponding EP patent application 9220012.9, dated Apr. 20, 2020.
Sureka et al., DSP Implementation of a DRP(TM)-Based Low Cost Software-Defined Emergency Radio, 3rd International Conference on SIgnal Processing and Communicatioin Systems, IEEE, Piscataway, NJ, USA, pp. 1-5, dated Sep. 28, 2009.

\* cited by examiner

*Primary Examiner* — Edan Orgad
*Assistant Examiner* — Malick A Sohrab
(74) *Attorney, Agent, or Firm* — Husch Blackwell LLP

(57) ABSTRACT

Systems and methods for classifying a P25 Phase 1 downlink transmission as using either C4FM modulation or CQPSK modulation are provided. Some methods can include calculating a first signal-to-noise ratio (SNR) at or near a middle of a first symbol of a received wireless signal, calculating a second SNR at or near an edge of the first symbol, calculating a difference between the second SNR and the first SNR, determining whether the difference is greater than a threshold, and classifying a modulation technique of the received wireless signal as either C4FM modulation or CQPSK modulation based on whether the difference is greater than the threshold.

15 Claims, 6 Drawing Sheets they invention relates generally to wireless com-
SYSTEMS AND METHODS FOR WIRELESS SIGNAL CLASSIFICATION

FIELD

The present invention relates generally to wireless communication. More particularly, the present invention relates to systems and methods for classifying a frequency modulation technique of a received wireless signal.

BACKGROUND

Project 25 (P25) is a suite of standards for digital mobile radio communications designed for use by public safety organizations in North America. Phase 1 of P25 uses a frequency-division multiple access (FDMA) protocol, and P25 radios use two different modulation techniques in outbound (i.e. downlink) transmissions: continuous 4 level frequency (C4FM) modulation and continuous quadrature phase shift keying (CQPSK) modulation. C4FM modulation is an analog modulation scheme that uses four different frequency deviations (e.g. +1800 Hz, +600 Hz, −600 Hz, and −1800 Hz) to represent two bits of communication input (i.e. a symbol). Meanwhile, CQPSK modulation is a digital modulation scheme that uses four phase changes (e.g. +135°, +45°, −45°, and −135°) to a symbol.

Both C4FM and CQPSK signals are transmitted at 4800 symbols per second and have the same frame format. Additionally, the phase changes in CQPSK modulation can be translated to C4FM frequency shifts (e.g. 135°/360°*4800 Hz=1800 Hz or 45°/360°*4800 Hz=600 Hz). Therefore, C4FM and CQPSK signals are very similar when a symbol is measured, and P25 radios have difficultly classifying whether an incoming transmission is using C4FM or CQPSK modulation.

Conventional systems and methods used to classify between C4FM modulation and CQPSK modulation use a cyclostationary feature of a modulated signal and rely on a time domain spectral autocorrelation function (SAF) to analyze the cyclostationary feature of the modulated signal and to classify modulation techniques based on a difference in locations of peaks in the SAF. However, these conventional systems and methods must generate three-dimensional graphs of the SAF for every input sample at an oversampled rated, which involves high computational complexity. Furthermore, generating these three-dimensional graphs involves FFT and window smoothing, which also involves a high computational complexity.

In view of the above, there is a continuing, ongoing need for improved systems and methods.

DETAILED DESCRIPTION

Figure 1:
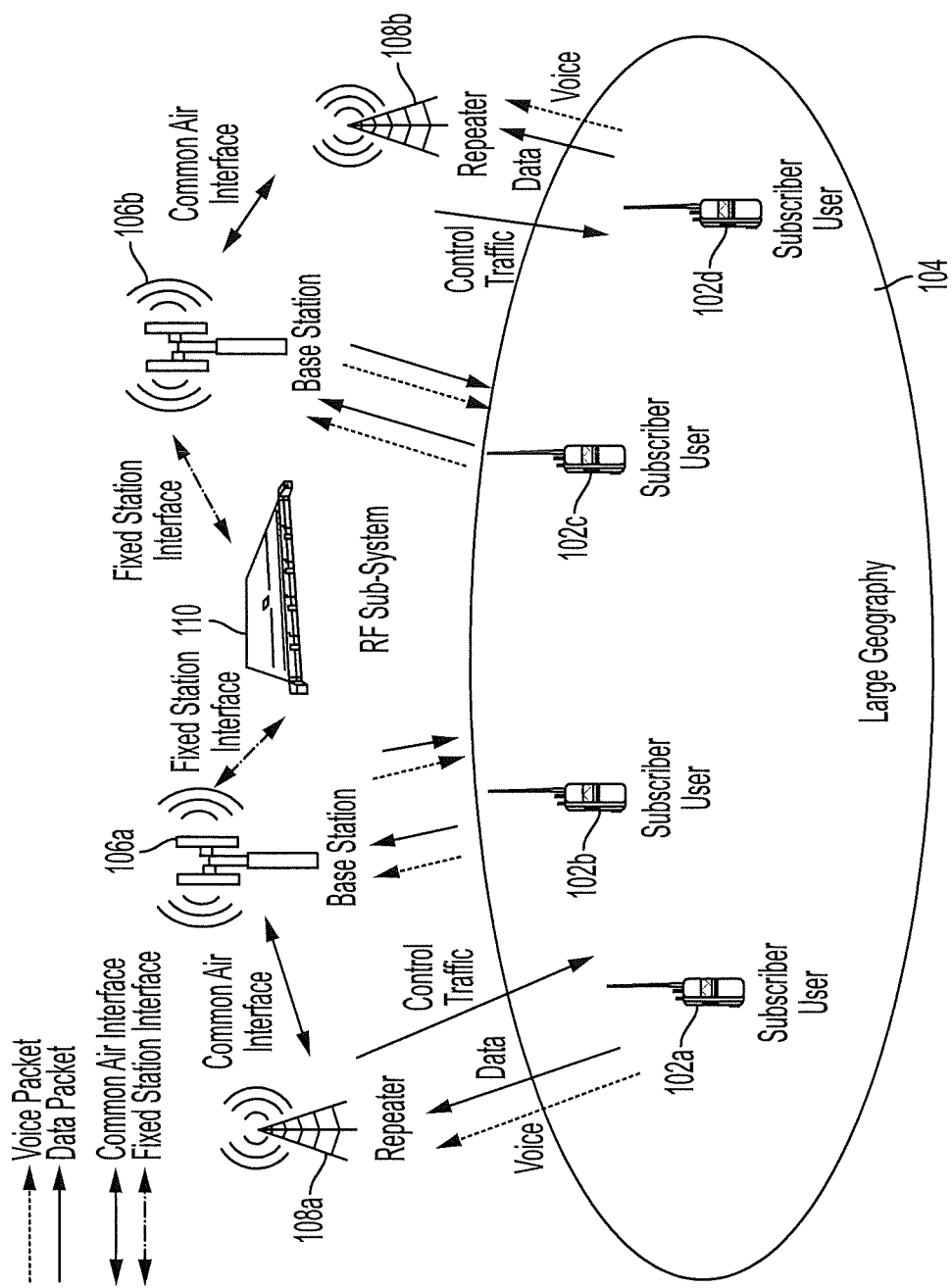
FIG. 1 is a diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for classifying a P25 Phase 1 downlink transmission as using either C4FM modulation or CQPSK modulation. In some embodiments, P25 user equipment or a P25 receiver can execute a method for identifying such a classification.

Embodiments disclosed herein can classify the downlink transmission by calculating a signal-to-noise ratio (SNR) for the downlink transmission at least at an edge of a symbol and at a middle of the symbol and can calculate a difference between the SNR at the edge of the symbol and the SNR at the middle of the symbol. Because C4FM modulation has a constant envelop at both the middle of the symbol and the edge of a symbol, for C4FM signals, the SNR at the middle of the symbol can be similar or the same as the SNR at the edge of a symbol. Meanwhile, CQPSK modulation does not have a constant envelop at the edge of symbol so, for CQPSK signals, the SNR at the middle of the symbol can be significantly different than the SNR at the edge of the symbol. Accordingly, embodiments disclosed herein can use the difference between the SNR at the edge of the symbol and the SNR at the middle of the symbol to classify the downlink transmission as either a C4FM signal or a CQPSK signal. More specifically, if the difference between the SNR at the edge of the symbol and the SNR at the middle of the symbol is greater than a threshold, then embodiments disclosed herein can classify the downlink transmission as a CQPSK signal, whereas if the difference between the SNR at the edge of the symbol and the SNR at the middle of the symbol is lower than the threshold, then embodiments disclosed herein can classify the downlink transmission as a C4FM signal.

FIG. 1 is a diagram of a system in accordance with disclosed embodiments. As shown in FIG. 1, the system 100 can include a plurality of user devices 102a-102d. In some embodiments, each of the plurality of user devices 102a-102d can include a respective P25 radio configured to send and receive P25 wireless communications. Each of the plurality of user devices 102a-102d can be located in a respective location within a geographic area 104.

The plurality of user devices 102a-102d can receive data and voice communications from a base station 106a, 106b or a repeater 108a, 108b and can transmit data to one of the base stations 106a, 106b or one of the repeaters 108a, 108b. In some embodiments, the base stations 106a, 106b and/or the repeaters 108a, 108b can relay the P25 wireless communications to one of the plurality of user devices 102a-102d or an RF subsystem 110. For example, a first of the plurality of user devices 102a can transmit either a voice or data communication to a second of the plurality of user devices 102b via a first repeater 108a or a first base station 106a or both. The P25 wireless communications can originate from the RF subsystem 110.

Figure 2:
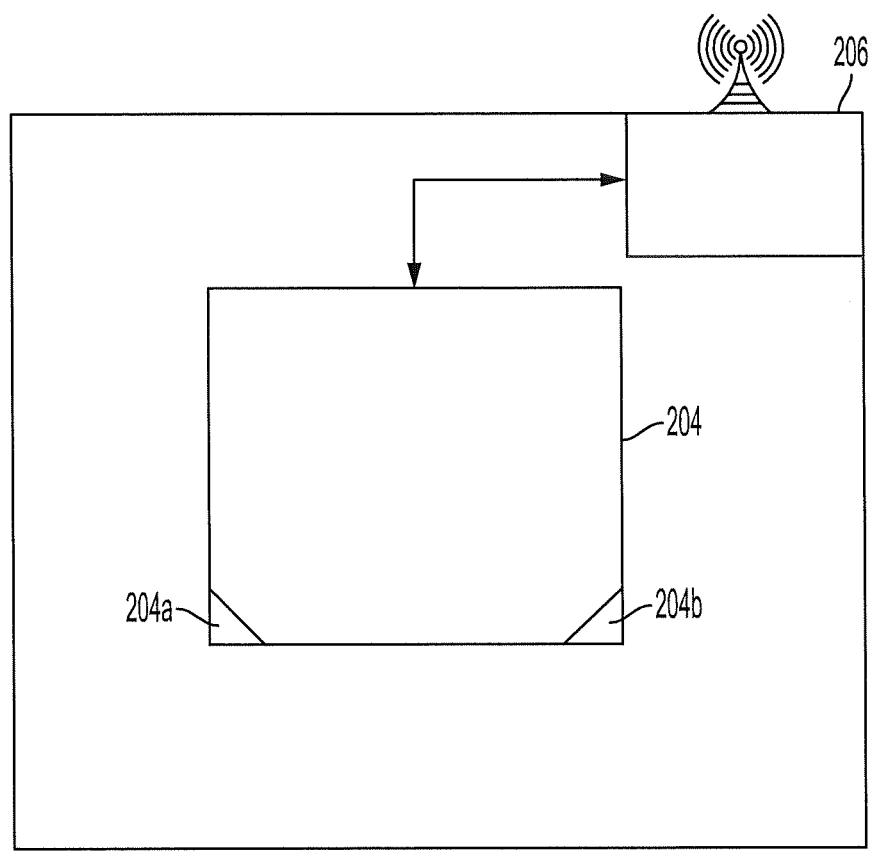
FIG. 2 is a block diagram of a user device in accordance with disclosed embodiments.

FIG. 2 is a block diagram of a user device (e.g. any of the plurality of user devices 102a-102d) in accordance with disclosed embodiments. As shown in FIG. 2, a user device 200 can include control circuitry 204, which can include one or more programmable processors 204a and executable control software 204*b* as would be understood by one of ordinary skill in the art. The executable control software 204*b* can be stored on a transitory or non-transitory computer readable medium, including, but not limited to local computer memory, RAM, optical storage media, magnetic storage media, and the like. In some embodiments, the control circuitry 204, the programmable processor 204*a*, and the executable control software 204*b* can execute and control some of the methods disclosed herein.

The user device 200 can also include a wireless communication interface 206. For example, the wireless communication interface 206 can include an antenna and corresponding communication hardware as would be understood by one of ordinary skill in the art for sending and receiving the P25 wireless communications.

Figure 3:
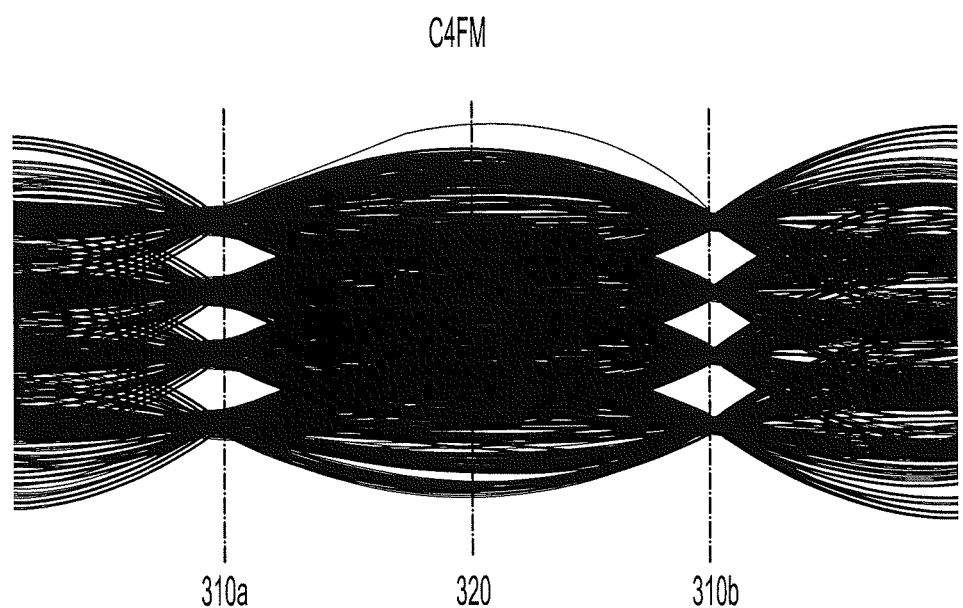
FIG. 3 is an eye diagram of a C4FM signal in accordance with disclosed embodiments.

As explained above, C4FM modulation has a constant envelope at both a middle of a symbol and an edge of the symbol, and FIG. 3 is an eye diagram of a C4FM signal showing the constant envelop of C4FM signals. As shown in FIG. 3, the C4FM signal has the constant envelop at both the middle 310*a*, 310*b* of the symbol (e.g. where the symbol is measured) and at the edge 320 of the symbol (i.e. between two consecutive symbols).

Figure 4:
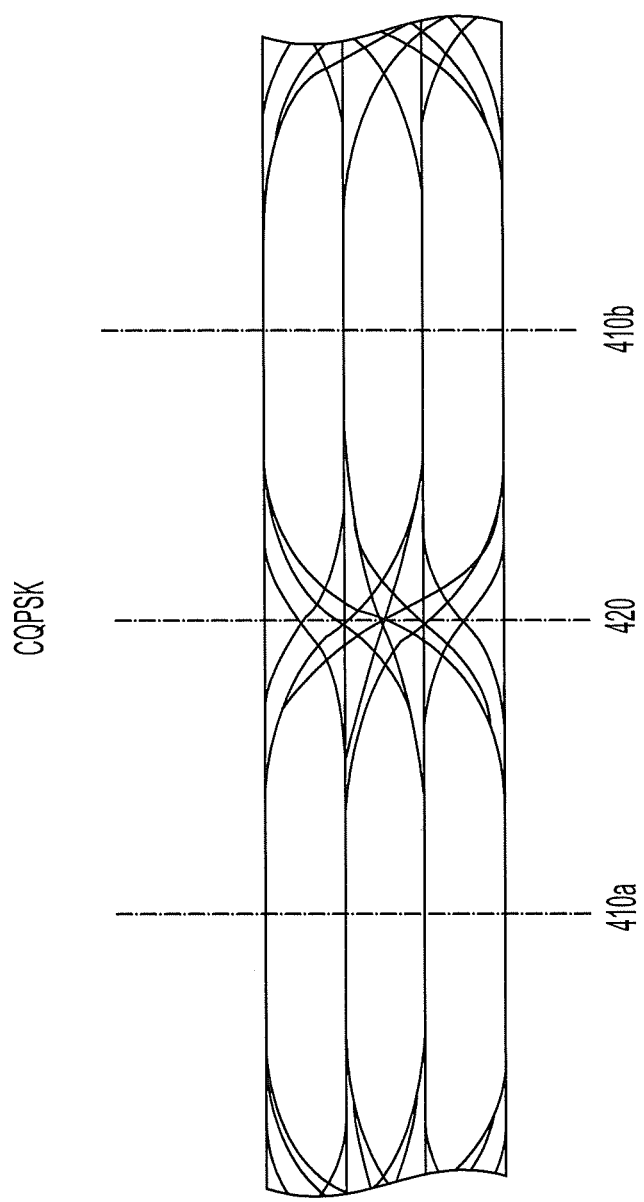
FIG. 4 is an eye diagram of a CQPSK signal in accordance with disclosed embodiments.

In contrast, CQPSK modulation does not have the constant envelope at both the middle of the symbol and the edge of the symbol. Instead, CQPSK modulation has the constant envelop only in the middle of the symbol, and FIG. 4 is an eye diagram of a CQPSK signal showing the same. As shown in FIG. 4, the CQPSK signal has the constant envelop at the middle 410*a*, 410*b* of the symbol, but does not have the constant envelop at the edge 420 of a symbol.

Figure 5:
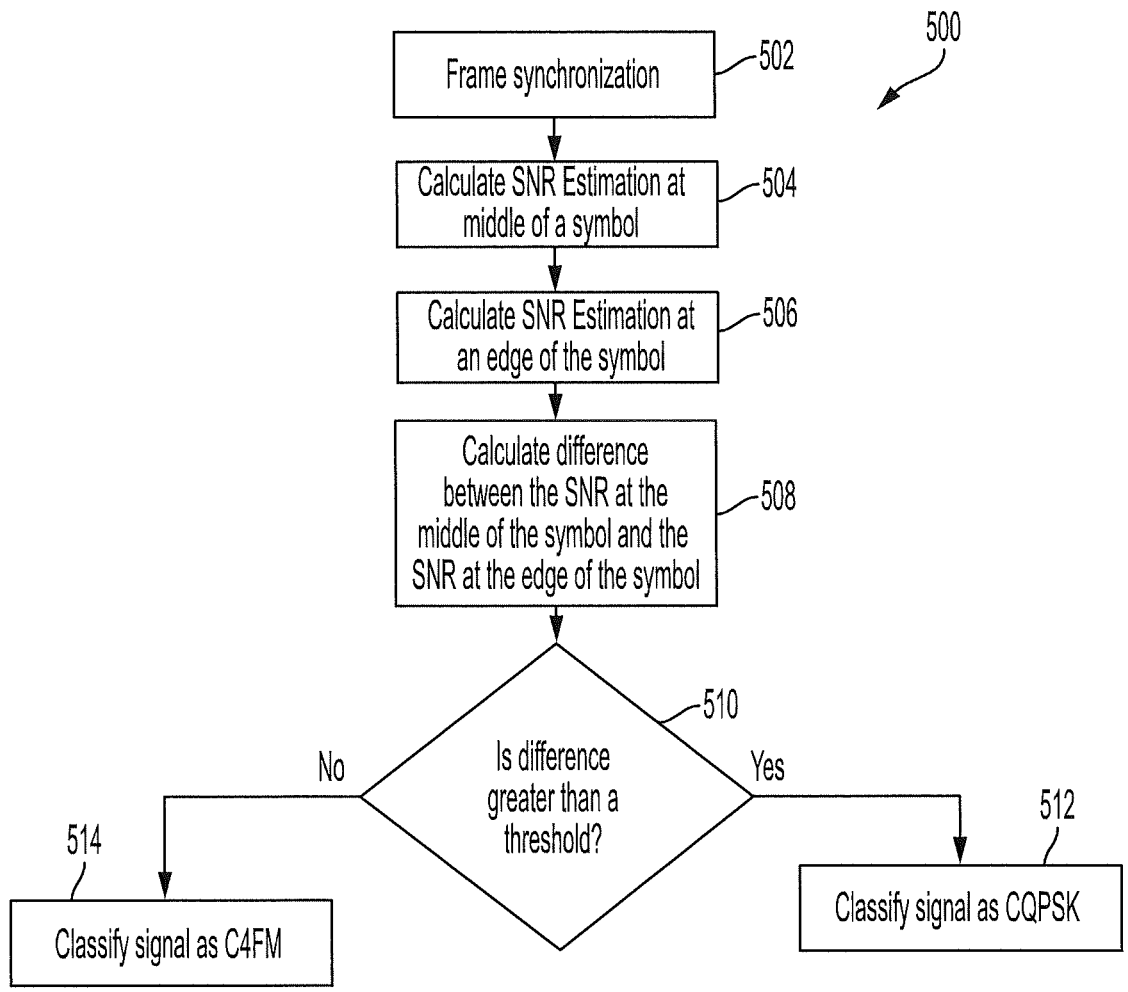
FIG. 5 is a flow diagram of a method in accordance with disclosed embodiments.

Embodiments disclosed herein can leverage differences between CQPSK and C4FM signals at the edge of any symbol to classify an incoming transmission as having either C4FM modulation or CQPSK modulation. For example, FIG. 5 is a flow diagram of a method 500 in accordance with disclosed embodiments. As shown in FIG. 5, the method 500 can include a user device (e.g. the user device 200) synchronizing a frame pattern of a received wireless signal to find frame and symbol timing as in 502. For example, in some embodiments, the user device can perform frame synchronization to decode the received wireless signal. As such, the user device can synchronize the frame pattern as in 502 for both signal classification and signal decoding.

Then, the method 500 can include the user equipment calculating an SNR estimation at or near a middle of a symbol as in 504, the user equipment calculating an SNR estimation at or near an edge of the symbol as in 506, and the user equipment calculating a difference between the SNR estimation at the middle of the symbol and the SNR estimation at the edge of the symbol as in 508. After calculating the difference, the user device can determine whether the difference is greater than a threshold as in 510.

When the difference is greater than the threshold, the user device can classify the received wireless signal as a CQPSK signal using CQPSK modulation as in 512. However, when the difference is lower than or equal to the threshold, the user device can classify the received wireless signal as a C4FM signal using C4FM modulation as in 514.

It is to be understood that the user device can periodically or repeatedly execute the method 500 such that the user device can execute the method 500 in connection with each symbol received to classify the received wireless signal. After the user device classifies the received wireless signal, the user device can accurately decode the received wireless signal according to an appropriate modulation technique: C4FM modulation or CQPSK modulation.

Figure 6:
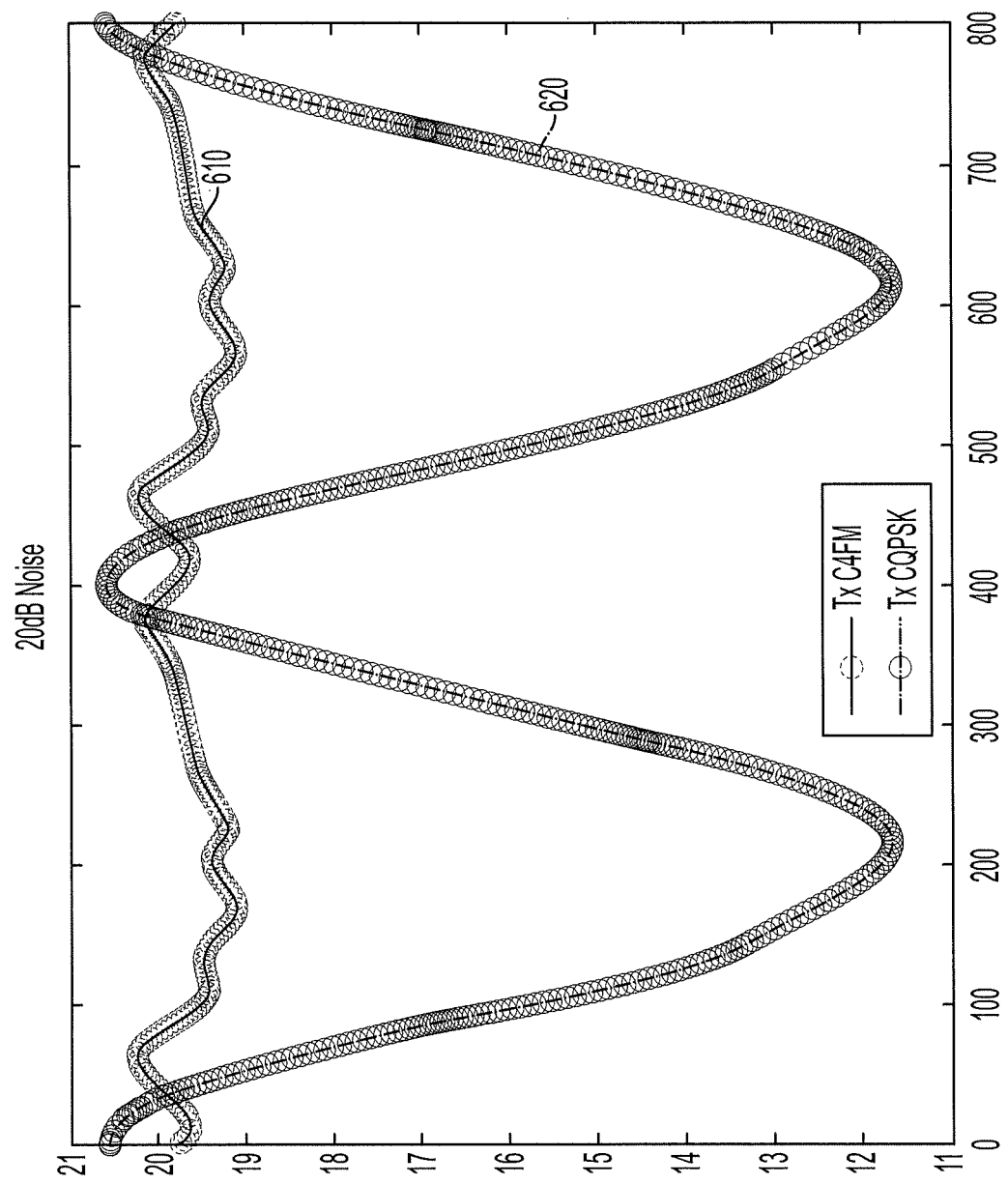
FIG. 6 is an oversampled plot of SNR estimations for both a C4FM signal and a CQPSK signal in accordance with disclosed embodiments.

FIG. 6 is a plot showing results of oversampling two received P25 signals by 400 times. The x-axis of the plot in FIG. 6 represents sampling points, and the y-axis represents SNR values. A first signal 610 can represent a C4FM signal, and a second signal 620 can represent a CQPSK signal. Middles of symbols can be represented by points 0, 400, and 800 on the x-axis, and edges of symbols can be represented by points 200 and 600 on the x-axis.

As shown in FIG. 6, differences between the C4FM signal 610 and the CQPSK signal 620 are most pronounced at the edges of symbols (points 200 and 600 on the x-axis), whereas SNR values are generally similar in value at the middles of symbols (points 0, 400, and 800 on the x-axis). While FIG. 6 illustrates two signals greatly oversampled, it is to be understood that, in accordance with disclosed embodiments, SNR estimations need only be calculated twice: at the middle of a symbol (e.g. 0, 400, or 800 on the x-axis) and at the edge of the symbol (200 and 600 on the x-axis).

The embodiments described herein solve a major problem of the prior art, namely, classifying modulation in P25 communication quickly and with low computational complexity. For example, a received wireless signal can be classified as either a C4FM signal using C4FM modulation or a CQPSK signal using CQPSK modulation by only sampling twice per symbol, calculating a difference, and comparing the difference to a threshold. As such, P25 signals can be classified using minimal computational resources, thereby improving the functioning of a P25 receiver.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
control circuitry calculating a first signal-to-noise ratio (SNR) at or near a middle of a first symbol of a received wireless signal;
the control circuitry calculating a second SNR at or near an edge of the first symbol;
the control circuitry calculating a first difference between the second SNR and the first SNR;
the control circuitry determining whether the first difference is greater than a threshold;
the control circuitry classifying a modulation technique of the received wireless signal as continuous 4 level frequency (C4FM) modulation when the first difference is less than or equal to the threshold; and
the control circuitry classifying the modulation technique as continuous quadrature phase shift keying (CQPSK) modulation when the first difference is greater than the threshold.

2. The method of claim 1 further comprising:
the control circuitry calculating a third SNR at a middle of a second symbol of the received wireless signal;

the control circuitry calculating a fourth SNR at an edge of the second symbol;

the control circuitry calculating a second difference between the fourth SNR and the third SNR;

the control circuitry determining whether the second difference is greater than the threshold; and the control circuitry classifying the modulation technique of the received wireless signal based on whether the second difference is greater than the threshold.

3. The method of claim 1 wherein the received wireless signal is a Project 25 (P25) wireless signal.

4. The method of claim 3 wherein the control circuitry is part of a P25 radio.

5. The method of claim 3 wherein the received wireless signal is a downlink transmission.

6. The method of claim 1 further comprising:

decoding the received wireless signal based on the modulation technique as classified.

7. The method of claim 1 further comprising:

synchronizing a frame pattern of the received wireless signal to find frame and symbol timing.

8. A system comprising:

a wireless communication interface configured to receive a wireless signal; and a processor configured to calculate a first signal-to-noise ratio (SNR) at or near a middle of a first symbol of the wireless signal, calculate a second SNR at or near an edge of the first symbol, calculate a difference between the second SNR and the first SNR, determine whether the difference is greater than a threshold, classify a modulation technique of the wireless signal as continuous 4 level frequency (C4FM) modulation when the difference is less than or equal to the threshold, and classify the modulation technique as continuous quadrature phase shift keying (CQPSK) modulation when the difference is greater than the threshold.

9. The system of claim 8 wherein the processor classifies the modulation technique for every symbol of the wireless signal.

10. The system of claim 8 wherein the wireless signal is a Project 25 (P25) signal.

11. The system of claim 10 wherein the wireless communication interface is a P25 radio.

12. The system of claim 10 wherein the wireless signal is a downlink transmission.

13. The system of claim 8 wherein the processor is configured to decode the wireless signal based on the modulation technique as classified.

14. The system of claim 8 wherein the processor is configured to synchronize a frame pattern of the wireless signal to find frame and symbol timing.

15. A non-transitory machine-readable medium comprising instructions, which, when executed by one or more processors, cause the one or more processors to perform the following operations:

calculate a first signal-to-noise ratio (SNR) at or near a middle of a symbol of a received wireless signal;

calculate a second SNR at or near an edge of the symbol;

calculate a difference between the second SNR and the first SNR;

determine whether the difference is greater than a threshold;

classify a modulation technique of the received wireless signal as continuous 4 level frequency (C4FM) modulation when the difference is less than the threshold; and classify the modulation technique as continuous quadrature phase shift keying (CQPSK) modulation when the difference is greater than the threshold.

\* \* \* \* \*